United States Patent
Minamino

(10) Patent No.: US 7,554,556 B2
(45) Date of Patent: Jun. 30, 2009

(54) COLOR IMAGE PROCESSING DEVICE AND COLOR IMAGE PROCESSING METHOD

(75) Inventor: Katsushi Minamino, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 601 days.

(21) Appl. No.: 11/126,980

(22) Filed: May 10, 2005

(65) Prior Publication Data

US 2005/0254076 A1 Nov. 17, 2005

(30) Foreign Application Priority Data

May 17, 2004 (JP) .............................. 2004-146625

(51) Int. Cl.
*G09G 5/02* (2006.01)

(52) U.S. Cl. .................. 345/600; 345/581; 345/589; 345/599; 345/605; 345/606; 345/643; 345/660; 382/167; 382/279

(58) Field of Classification Search .................. 345/599
See application file for complete search history.

(56) References Cited

U.S. PATENT DOCUMENTS

| 5,311,459 | A | * | 5/1994 | D'Luna et al. ............... 708/607 |
| 5,568,284 | A | * | 10/1996 | Oku et al. .................... 358/518 |
| 6,778,184 | B2 | * | 8/2004 | Arita et al. .................. 345/589 |

FOREIGN PATENT DOCUMENTS

| JP | 07-168808 | 7/1995 |
| JP | 2001-346053 | 12/2001 |
| JP | 2002-036631 | 2/2002 |
| JP | 2002-077651 | 3/2002 |
| JP | 2003-123063 | 4/2003 |
| JP | 2004-104197 | 4/2004 |

OTHER PUBLICATIONS

Machine English translation of specification of PTO-1449 cited JP-2002-077651. paragraphs 1-101. (pp. 1-18).*
Chinese language office action and its English translation for corresponding Chinese application 200510072884.2 lists the reference above original Chinese document dated Dec. 14, 2007.

* cited by examiner

*Primary Examiner*—Antonio A Caschera
(74) *Attorney, Agent, or Firm*—Hogan & Hartson LLP

(57) ABSTRACT

A color image processing device includes a pre-correction unit, a computation processing unit and a post-correction unit. The pre-correction unit includes a pre-correction circuit which carries out a pre-correction to reverse a highest-order bit of a pixel value on input data of a color component. The pre-correction unit selectively outputs the input data of the color component or the data of the color component pre-corrected by the pre-correction circuit according to the color component. The computation processing unit carries out a prescribed computation processing on the data of the color component output by the pre-correction unit and outputs the data of the color component carried out with the prescribed computation processing. The post-correction unit includes a post-correction circuit which carries out a post-correction to reverse a highest-order bit of a pixel value on the data of the color component output by the computation processing unit. The post-correction unit selectively outputs to a prescribed output destination according to the color component, the data of the color component output by the computation processing unit or the data of the color component post-corrected by the post-correction circuit.

5 Claims, 19 Drawing Sheets

FIG. 10

$$L*1 = (w2 \cdot l*1 + w1 \cdot l*2)/(w1+w2)$$

FIG. 11

$$L*22 = \sum_{i=1,j=1}^{3,3}(mij \cdot l*ij) / \sum_{i=1,j=1}^{3,3} mij$$

FIG. 12

$$A*1 = (w2(a*1+128)+w1(a*2+128))/(w1+w2)$$
$$= (w2 \cdot a*1 + w1 \cdot a*2 + 128(w1+w2))/(w1+w2)$$
$$= ((w2 \cdot a*1 + w1 \cdot a*2)/(w1+w2)) + 128$$

FIG. 13

$$A*22 = \sum_{i=1,j=1}^{3,3}(mij \cdot (a*ij+128))/\sum_{i=1,j=1}^{3,3}mij$$

$$= (\sum_{i=1,j=1}^{3,3}(mij \cdot a*ij)/\sum_{i=1,j=1}^{3,3}mij)+128$$

FIG. 14

$$L*22' = \sum_{i=1, j=1}^{3,3} (mij \cdot l*ij)$$

FIG. 15

$$L*22 = L*22' / \sum_{i=1, j=1}^{3,3} mij$$

FIG. 16

$$A*_{22}' = \sum_{i=1,j=1}^{3,3} (m_{ij} \cdot (a*_{ij} + 128))$$

$$= \sum_{i=1,j=1}^{3,3} (m_{ij} \cdot a*_{ij}) + 128 \cdot \sum_{i=1,j=1}^{3,3} m_{ij}$$

FIG. 17

$$A*22'-128 \cdot \sum_{i=1,j=1}^{3,3} mij = \sum_{i=1,j=1}^{3,3} (mij \cdot aij)$$

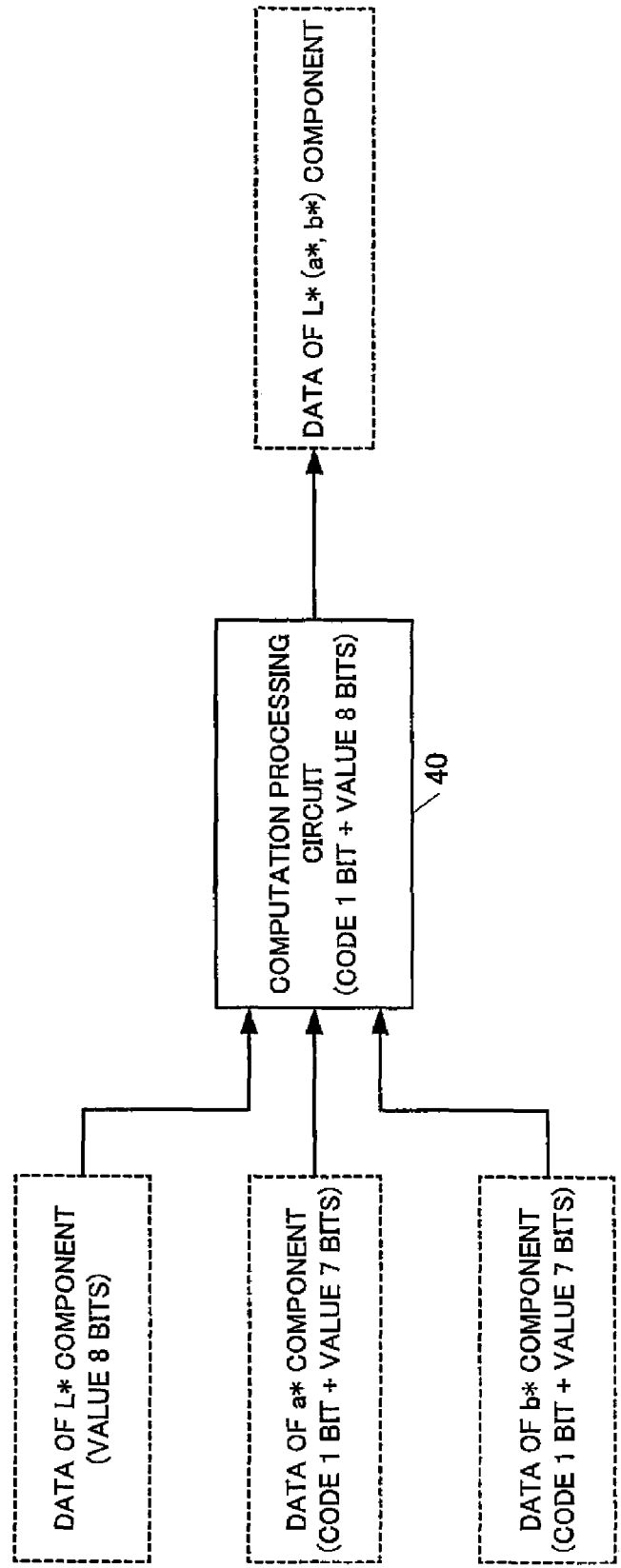

COLOR IMAGE PROCESSING DEVICE AND COLOR IMAGE PROCESSING METHOD

BACKGROUND OF THE INVENTION

1. Field of the Invention

The present invention relates to a color image processing device provided in a copying machine, a printer machine, a facsimile machine and a scanner machine or the like. In particular, the present invention relates to a color image processing device which carries out a scaling processing or a spatial filtering processing of a color image.

2. Description of Related Art

A color image processing device provided in a printer machine and a scanner machine or the like includes an image processing circuit such as a scaling processing circuit for executing a scaling processing and a spatial filtering processing circuit for executing a spatial filtering processing on scanned color image data of an original document. Inside the color image processing device, a pixel value of each data of the color image data is expressed by a binary digit. For example, in case of color image data of a L*a*b* color system of eight bits, a pixel value of data of L* component (0 to 255), which takes only a positive value, is expressed by eight bits. A pixel value of data of an a* component and data of a b* component (−128 to 127), which takes both a positive value and a negative value, is expressed by code one bit and value seven bits.

Therefore, in a conventional color image processing device, as shown in FIG. 18, an image processing circuit, which executes a computation processing on the color image data of the L*a*b* color system, includes two computation processing circuits, i.e. a computation processing circuit 37 and a computation processing circuit 38. The computation processing circuit 37 executes a computation processing on the data of the color component, which takes only a positive value (the data of the L* component). The computation processing circuit 38 executes a computation processing on the data of the color component, which takes both a positive value and a negative value (the data of the a* component and the b* component). Then, among the color image data of the L*a*b* color system, a selection circuit 39 inputs the data of the L* component to the computation processing circuit 37 and inputs the data of the a* component and the b* component to the computation processing circuit 38. As described above, the data of the L* component and the data of the a* component and the b* component are processed by two computation processing circuits 37 and 38.

Another conventional color image processing device can process data of each of color components of color image data of a L*a*b* color system by one computation processing circuit. As shown in FIG. 19, an image processing circuit of the conventional color image processing device includes one computation processing circuit 40 which can process data of nine bits. The computation processing circuit 40 can process the data of all of the color components of the data of the L* component of eight bits and the data of the a* component and the b* component expressed by code one bit and value seven bits. Each of the data of the L* component, the data of the a* component and the data of the b* component is input to the computation processing circuit 40. In the computation processing circuit 40, a computation processing such as a scaling processing and a spatial filtering processing is executed on the color image data composed of the data of the L* component, the data of the a* component and the data of the b* component.

However, in the conventional color image processing device shown in FIG. 18, the computation processing is executed separately on the data of the color component, which takes only a positive value, and the data of the color component, which takes both a positive value and a negative value. Therefore, two computation processing circuits, i.e. the computation processing circuit 37 and the computation processing circuit 38, are required to be provided in the image processing circuit. Thus, there is a drawback that a hardware configuration of the image processing circuit becomes large.

In the conventional color image processing device shown in FIG. 19, both the data of the color component, which takes only a positive value, and the data of the color component, which takes both a positive value and a negative value, can be processed in one computation processing circuit. However, to process both of the above-mentioned data by one computation processing circuit, a bit number of the data, which can be processed by the computation processing circuit 40, is required to be set larger than the computation processing circuit 37 or the computation processing circuit 38. Thus, there is a drawback that in the conventional color image processing device shown in FIG. 19, a hardware configuration of the image processing circuit becomes large as in the conventional color image processing device shown in FIG. 18.

SUMMARY OF THE INVENTION

The present invention has been made in consideration of the above-described drawbacks. An advantage of the present invention is to provide a color image processing device and a color image processing method which can simplify a hardware configuration of an image processing circuit.

According to an aspect of the present invention, a color image processing device carries out a prescribed image processing on color image data composed of data of a plurality of color components. The color image processing device includes a pre-correction unit, a computation processing unit and a post-correction unit. The pre-correction unit includes a pre-correction circuit which carries out a pre-correction on input data of a color component to reverse a highest-order bit of a pixel value. According to the color component, the pre-correction unit selectively outputs the input data of the color component or the data of the color component pre-corrected by the pre-correction circuit. The computation processing unit executes a prescribed computation processing on the data of the color component output by the pre-correction unit and outputs the data of the color component executed with the prescribed computation processing. The post-correction unit includes a post-correction circuit which carries out a post-correction on the data of the color component output by the computation processing unit to reverse the highest-order bit of the pixel value. According to the color component, the post-correction unit selectively outputs to a prescribed output destination, the data of the color component output by the computation processing unit or the data of the color component post-corrected by the post-correction circuit.

The prescribed computation processing executed by the computation processing unit is a scaling processing which calculates a new pixel value by carrying out a computation of interpolation by using a plurality of pixel values.

The prescribed computation processing executed by the computation processing unit is a spatial filtering processing which calculates a new pixel value by carrying out a computation of convolution by using a plurality of pixel values and prescribed filtering coefficients.

According to another aspect of the present invention, the color image processing device carries out a prescribed image processing on color image data composed of data of a plurality of color components. The color image processing device includes a pre-correction unit, a computation processing unit, a first post-correction unit and a second post-correction unit. The pre-correction unit includes a pre-correction circuit which carries out a pre-correction on input data of a color component to reverse a highest-order bit of a pixel value. According to the color component, the pre-correction unit selectively outputs the input data of the color component or the data of the color component pre-corrected by the pre-correction circuit. The computation processing unit executes a computation processing on the data of the color component output by the pre-correction unit to calculate a total of a product of the plurality of pixel values and the prescribed filtering coefficients. Then, the computation processing unit outputs the data of the color component executed with the computation processing. The first post-correction unit includes a post-correction circuit which executes a prescribed computation processing on the data of the color component output by the computation processing unit by using a sum of the prescribed filtering coefficients. According to the color component, the first post-correction unit selectively outputs the data of the color component output by the computation processing unit or the data of the color component on which the prescribed computation processing has been carried out by the post-correction circuit. The second post-correction unit executes a computation processing to divide the data of the color component output by the first post-correction unit by a power-of-two and outputs the data of the color component executed with the computation processing to a prescribed output destination.

According to one aspect of the present invention, with respect to the data of the color component which includes a negative value in a numerical range of the pixel value, the pre-correction unit reverses the highest-order bit of the pixel value and corrects the numerical range of the pixel value to a positive value. Therefore, the color image processing device is not required to include both of the computation processing circuit, which executes a computation processing on the data of the color component that takes only a positive value, and the computation processing circuit, which executes a computation processing on the data of the color component that takes both a positive value and a negative value. The color image processing device can include only the computation processing circuit, which executes the computation processing on the data of the color component that takes only a positive value. The pre-correction unit corrects the numerical range of the pixel value to a positive value. As a result, since the bit expressing the code becomes unnecessary, the bit number of the computation processing circuit does not become large. Thus, the hardware configuration of the image processing circuit can be simplified.

According to the color image processing device of the present invention, the scaling processing circuit having a simplified hardware configuration can be provided.

According to the color image processing device of the present invention, the spatial filtering processing having a simplified hardware configuration can be provided.

According to the color image processing device of the present invention, since the division by the second post-correction unit becomes a bit-shift, the spatial filtering processing circuit having a simplified hardware configuration can be provided.

BRIEF DESCRIPTION OF THE DRAWINGS

FIG. 10 shows a computation equation for finding a pixel value L*1 to be interpolated.

FIG. 11 shows a computation equation for finding a pixel value L*22 executed with a spatial filtering processing.

FIG. 12 shows a computation equation for finding a pixel value A*1 to be interpolated.

FIG. 13 shows a computation equation for finding a pixel value A*22 executed with a spatial filtering processing.

FIG. 14 shows a computation equation for finding a pixel value L*22' executed with a spatial filtering processing.

FIG. 15 shows a computation equation for finding the pixel value L*22 executed with the spatial filtering processing.

FIG. 16 shows a computation equation for finding the pixel value A*22' executed with the spatial filtering processing.

FIG. 17 shows a computation equation carried out by a first post-correction circuit.

FIG. 19 shows an example of a configuration of a conventional image processing circuit.

DETAILED DESCRIPTION OF THE INVENTION

A color image processing device 1 according to a first embodiment of the present invention will be described with reference to the drawings. The color image processing device 1 carries out a prescribed image processing such as a scaling processing and a spatial filtering processing on color image data composed of data of a plurality of color components. Further, in the present embodiment, a description will be made of an example in which the color image processing device 1 is applied to a copying machine. However, the present invention is not limited to this example and can be applied to another machine such as a color facsimile machine.

Figure 1:
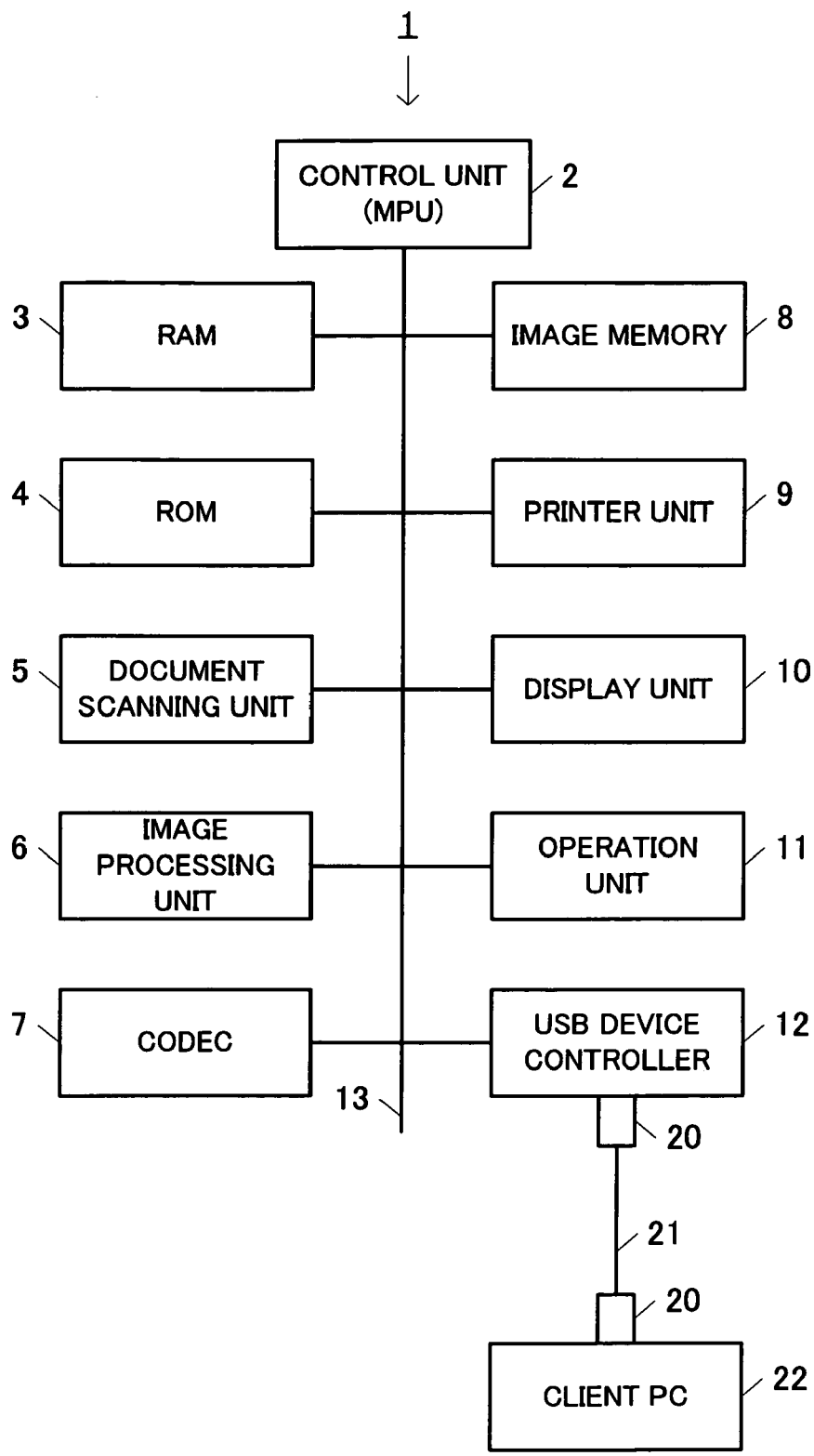
FIG. 1 shows an example of a configuration of a color image processing device according to an embodiment of the present invention.

As shown in FIG. 1, the color image processing device 1 includes a control unit (Micro Processing Unit (MPU)) 2, a Random Access Memory (RAM) 3, a Read Only Memory (ROM) 4, a document scanning unit 5, an image processing unit 6, a codec 7, an image memory 8, a printer unit 9, a display unit 10, an operation unit 11 and a Universal Serial Bus (USB) device controller 12. Each of the units 2 through 12 is connected via a bus 13 in a manner that a communication can be carried out.

The control unit 2 controls each of the units of the color image processing device 1 in accordance with a control program stored in the ROM 4. The RAM 3 functions as a main memory and a working area or the like of the control unit 2. The ROM 4 stores the control program.

Although not shown in the drawing, the document scanning unit 5 includes a color line sensor, an Analog-to-Digital (A/D) converter and an image processing circuit or the like. The document scanning unit 5 scans color image data of an original document and executes an image processing such as an A/D conversion, a shading correction and a gap/line correction. Then, the document scanning unit 5 outputs color image data of a Red-Green-Blue (RGB) color system executed with the image processing to a prescribed output destination. A pixel value of data of each color component in the color image data of the RGB color system output from the document scanning unit 5 is expressed by eight bits, for example, from 0 to 255, for each of a R component, a G component and a B component. Further, the document scanning unit 5 can scan monochrome image data of an original document and, for example, the printer unit 9 can print an image of the scanned monochrome image data onto printing paper. However, in the present embodiment, a description will be made of a case in which the document scanning unit 5 scans color image data.

Figure 2:
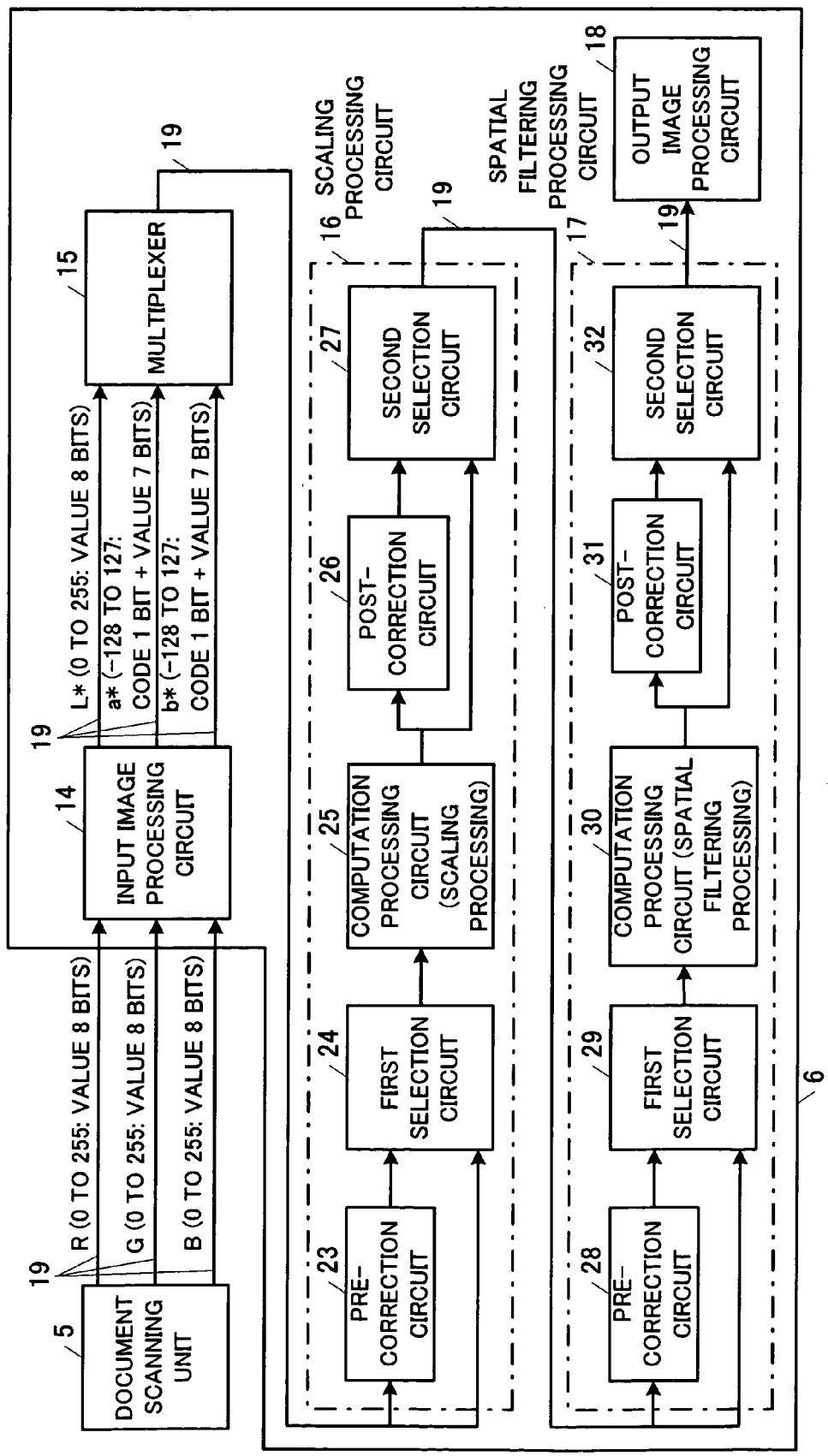
FIG. 2 shows an example of a configuration of an image processing unit of a color image processing device according to a first embodiment of the present invention.

As shown in FIG. 2, the image processing unit 6 includes an input image processing circuit 14, a multiplexer 15, a scaling processing circuit 16, a spatial filtering processing circuit 17 and an output image processing circuit 18. As shown in the drawing, each of the components of the image processing unit 6 is connected via an image bus 19. In case the document scanning unit 5 scans color image data of an original document by a copying function, the input image processing circuit 14 carries out a color space conversion of the color image data of the RGB color system, which is output from the document scanning unit 5, into color image data of a L*a*b* color system. Then, the input image processing circuit 14 outputs the converted color image data to a prescribed output destination. In case the document scanning unit 5 scans color image data of an original document by a Personal Computer (PC) scanner function, the input image processing circuit 14 outputs the color image data of the RGB color system, which is output from the document scanning unit 5, directly to a prescribed output destination. As described above, the input image processing circuit 14 outputs the color image data of the RGB color system, which is output from the document scanning unit 5, to a prescribed output destination directly or by converging the color space into the color image data of the L*a*b* color system. Further, in the color image data of the L*a*b* color system which the color space has been converted by the input image processing circuit 14, a pixel value of data of an L* component is expressed by eight bits, for example, from 0 to 255. In the color image data of the L*a*b* color system which the color space has been converted by the input image processing circuit 14, since data of an a* component and a b* component includes a negative value in a numerical range of a pixel value, the pixel value of the data of the a* component and the b* component is expressed by code one bit and value seven bits, for example, from −127 to 128.

The multiplexer 15 outputs the color image data of the RGB color system or the L*a*b* color system to the scaling processing circuit 16 for each color component. The multiplexer 15 is controlled by a control signal from the control unit 2. For example, in case the control signal from the control unit 2 is "0", the multiplexer 15 outputs the data of the R component or the L* component to the scaling processing circuit 16. In case the control signal from the control unit 2 is "1", the multiplexer 15 outputs the data of the G component or the a* component to the scaling processing circuit 16. In case the control signal from the control unit 2 is "2", the multiplexer 15 outputs the data of the B component or the b* component to the scaling processing circuit 16. The data of each color component is processed in the scaling processing circuit 16 and the spatial filtering processing circuit 17 by a time-division.

The scaling processing circuit 16 executes a scaling processing on the color image data of the RGB color system or the L*a*b* color system output from the multiplexer 15. The scaling processing circuit 16 outputs the color image data of the RGB color system or the L*a*b* color system executed with the scaling processing to the spatial filtering processing circuit 17. The scaling processing circuit 16 includes a pre-correction circuit 23, a first selection circuit 24, a computation processing circuit 25, a post-correction circuit 26 and a second selection circuit 27. The pre-correction circuit 23 carries out a pre-correction to reverse a highest-order bit of the pixel value on the data of each color component of the color image data of the RGB color system and the data of each color component of the color image data of the L*a*b* color system input from the multiplexer 15. The first selection circuit 24 selectively outputs to the computation processing circuit 25 according to the color component, the data of the color component input from the multiplexer 15 or the data of the color component pre-corrected by the pre-correction circuit 23. Specifically, with respect to the data of the color component (each of the R, G, B color components and the L* component), which does not include a negative value in the numerical range of the pixel value, the data of the color component input from the multiplexer 15 is output directly to the computation processing circuit 25. With respect to the data of the color component (the a* component and the b* component), which includes a negative value in the numerical range of the pixel value, the data of the color component pre-corrected by the pre-correction circuit 23 is output to the computation processing circuit 25. Therefore, the pre-correction circuit 23 and the first selection circuit 24 function as a pre-correction unit which selectively outputs the input data of the color component or the data of the color component pre-corrected by the pre-correction circuit 23 according to the color component. The first selection circuit 24 is controlled by the control signal from the control unit 2. For example, in case the data of the R component, the G component, the B component and the L* component is input, the control unit 2 inputs a signal of "0" to the first selection circuit 24. In accordance with the input signal of "0", the first selection circuit 24 outputs to the computation processing circuit 25, the data of the R component, the G component, the B component or the L* component input from the multiplexer 15. In case the data of the a* component or the b* component is input, the control unit 2 inputs a signal of "1" to the first selection circuit 24. In accordance with the input signal of "1", the first selection circuit 24 outputs to the computation processing circuit 25, the data of the a* component or the b* component pre-corrected by the pre-correction circuit 23.

The computation processing circuit 25 carries out a scaling processing to be described later on the data of each color component. The post-correction circuit 26 carries out a post-correction to reverse a highest-order bit of the pixel value on the data of each color component of the color image data of the RGB color system and the data of each color component of the color image data of the L*a*b* color system output from the computation processing circuit 25. The second selection circuit 27 selectively outputs to the spatial filtering processing circuit 17 according to the color component, the data of the color component output from the computation processing circuit 25 or the data of the color component post-corrected by the post-correction circuit 26. Specifically, with respect to the data of the color component which does not include a negative value in the numerical range of the pixel value, in other words, the color component which is not pre-corrected by the pre-correction circuit 23 (each of the R, G, B color components and the L* component), the data of the color component output by the computation processing circuit 25 is output directly to the spatial filtering processing circuit 25. With respect to the data of the color component which includes a negative value in the numerical range of the pixel value, in other words, the color component which is pre-corrected by the pre-correction circuit 23 (the a* component and the b* component), the data of the color component post-corrected by the post-correction circuit 26 is output to the spatial filtering processing circuit 17. Therefore, the post-correction circuit 26 and the second selection circuit 27 function as a post-correction unit which selectively outputs to a prescribed output destination according to the color component, the data of the color component output by the computation processing circuit 25 or the data of the color component post-corrected by the post-correction circuit 26. The second selection circuit 27 is controlled by the control signal from the control unit 2 in the same manner as the first selection circuit 24.

The spatial filtering processing circuit 17 executes a spatial filtering processing on the color image data of the RGB color system or the L*a*b* color system output from the scaling processing circuit 16. The spatial filtering processing circuit 17 outputs the color image data of the RGB color system executed with the spatial filtering processing to a multilevel memory of the image memory 8. The spatial filtering processing circuit 17 outputs the color image data of the L*a*b* color system executed with the spatial filtering processing to the codec 7, the multilevel memory of the image memory 8 or the output image processing circuit 18. The spatial filtering processing circuit 17 includes a pre-correction circuit 28, a first selection circuit 29, a computation processing circuit 30, a post-correction circuit 31 and a second selection circuit 32. The pre-correction circuit 28 functions in the same manner as the pre-correction circuit 23. The first selection circuit 29 functions in the same manner as the first selection circuit 24. The post-correction circuit 31 functions in the same manner as the post-correction circuit 26. The second selection circuit 32 functions in the same manner as the second selection circuit 27. The computation processing circuit 30 carries out a spatial filtering processing to be described later on the data of each color component. Further, an order of the scaling processing circuit 16 and the spatial filtering processing circuit 17 is not limited to the above-mentioned order. The spatial filtering processing circuit 17 can be provided before the scaling processing circuit 16 and after carrying out the spatial filtering processing in the spatial filtering processing circuit 17, the scaling processing can be carried out in the scaling processing circuit 16.

The output image processing circuit 18 carries out a color space conversion processing on the color image data of the L*a*b* color system output from the spatial filtering processing circuit 17 for converting into the color image data of an output color system. After carrying out the color space conversion processing, the output image processing circuit 18 carries out a binarization processing. The color image data of the output color system is expressed by four components of Cyan (C), Magenta (M), Yellow (Y) and blacK (K). The color image data of the output color system after the binarization processing is expressed by one bit for each component of C, M, Y and K. Binary image data binarized by the output image processing circuit 18 is output to the codec 7 or the binary memory of the image memory 8.

As shown in FIG. 1, the codec 7 encodes and decodes image data. Specifically, the codec 7 encodes the color image data of the L*a*b* color system, which is output from the spatial filtering processing circuit 17 of the image processing unit 6, by the Joint Photographic Experts Group (JPEG) method. The codec 7 decodes the image data encoded by the JPEG method. The codec 7 encodes the binary image data, which is output from the output image processing circuit 18 of the image processing unit 6, by the Modified Huffman (MH), the Modified Read (MR), the Modified Modified Read (MMR), the Joint Bi-level Image Group (JBIG) method or the like. The codec 7 decodes the encoded binary image data.

The image memory 8 includes the multilevel memory, the binary memory and an encoding memory. The multilevel memory stores the color image data of the RGB color system or the L*a*b* color system output from the spatial filtering processing circuit 17 of the image processing unit 6. The binary memory stores the binary image data binarized by the output image processing circuit 18. The encoding memory stores the color image data of the L*a*b* color system encoded by the codec 7.

The printer unit 9 prints an image of the image data retrieved from the image memory 8 onto prescribed paper. The printer unit 9 can print both color image and monochrome image onto the paper. As a printing method of the printer unit 9, for example, various printing methods such as an electrophotographic method and an inkjet printing method can be used.

The display unit 10 is formed from, for example, a Liquid Crystal Display (LCD) provided next to the operation unit 11. The display unit 10 displays various pieces of screen information. The operation unit 11 includes a ten-key numeric pad for inputting a number of copies, a start key for instructing to start a copying operation, or the like. The user carries out various operations from the operation unit 11.

The USB device controller 12 executes a device controller function of a USB. A USB port 20 is provided to the USB device controller 12. When one end of a USB cable 21 is connected to the USB port 20, the USB is formed and a communication can be carried out with a client PC 22. The USB device controller 12 transfers non-encoded color image data of the RGB color system or the like, which is stored in the multilevel memory of the image memory 8, to the client PC 22, which is connected in a manner capable of carrying out the communication as described above.

The above-described color image processing device 1 includes the copying function for scanning color image data of an original document and printing an image of the scanned color image data onto paper and the PC scanner function for scanning color image data of an original document and transferring an image of the scanned color image data to the client PC 22. The color image processing device 1 can execute the scaling processing and the spatial filtering processing on the color image data of the original document scanned when executing the copying function or the PC scanner function.

With reference to FIG. 2, a description will be made of a processing operation of the scaling processing circuit 16 when carrying out the scaling processing of the color image data of the L*a*b* color system, which is converted by the input image processing circuit 14 after the scanning process of the document scanning unit 5, and a processing operation of the spatial filtering processing circuit 17 when carrying out the spatial filtering processing on the color image data processed by the scaling processing circuit 16.

The color image data of the L*a*b* color system, which is converted by the input image processing circuit 14 after the scanning process of the document scanning unit 5, is input to the scaling processing circuit 16 for each data of each color component by the multiplexer 15. The data of the L* component, which the pixel value is expressed by eight bits, and the data of the a* component and the b* component, which the pixel value is expressed by code one bit and value seven bits, are input to the scaling processing circuit 16. In case the data of the L* component is input to the scaling processing circuit 16, the data of the L* component is input to the pre-correction circuit 23 and the first selection circuit 24. The pre-correction circuit 23 carries out a pre-correction on the input data of the L* component and outputs the pre-corrected data of the L* component to the first selection circuit 24. Here, since the data of the L* component does not include a negative value in the numerical range of the pixel value, the first selection circuit 24 selects the data of the L* component input from the multiplexer 15 and outputs the selected data of the L* component to the computation processing circuit 25. That is, the data of the L* component pre-corrected by the pre-correction circuit 23 is not output to the computation processing circuit 25.

Figure 3:
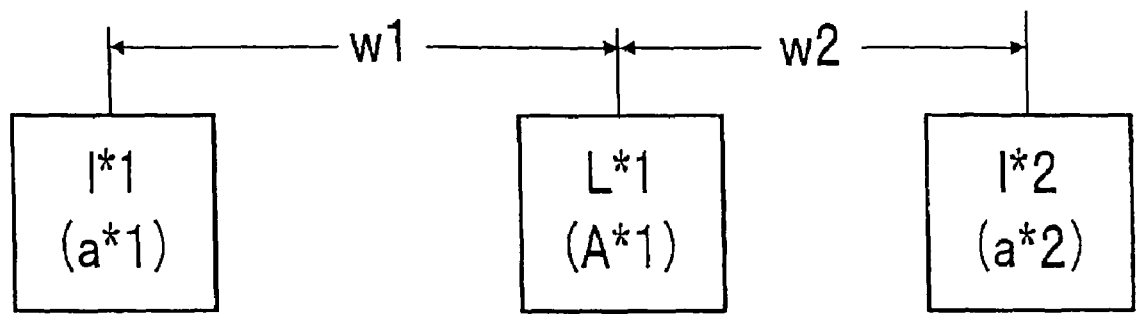
FIG. 3 is a view relating to a scaling processing of color image data.

In case of enlarging the color image data of the L*a*b* color system, the computation processing circuit 25 calculates a new pixel value, which generates accompanying an enlargement of the data of each color component, by a computation of interpolation based on the pixel value before the scaling processing. As shown in FIG. 3, suppose that there are two adjacent pixel values l*1 and l*2 of the L* component before the scaling processing, and a distance between a position of the pixel value L*1 to be interpolated between the two adjacent pixel values and a position of the pixel value l*1 and a distance between the position of the pixel value L*1 and a position of the pixel value l*2 are respectively w1 and w2. Then, in case of enlarging the data of the L* component, the computation processing circuit 25 carries out a computation of an equation shown in FIG. 10 for finding the pixel value L*1 to be interpolated.

Figure 4:
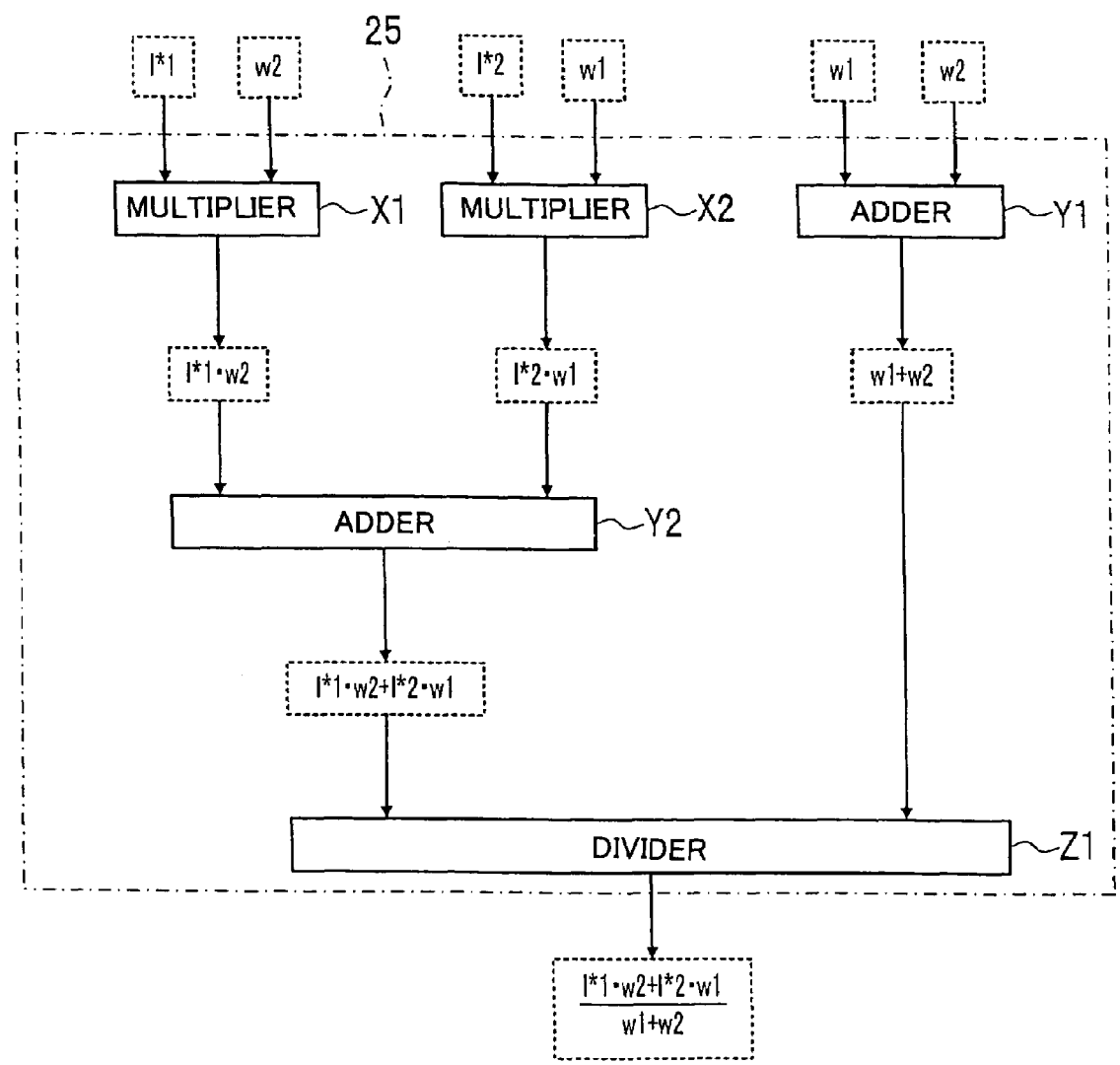
FIG. 4 shows an example of a configuration of a computation processing circuit in a scaling processing circuit.
Figure 10:
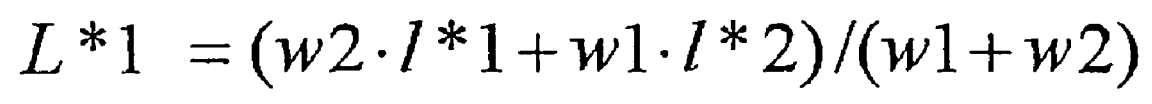

FIG. 4 shows a configuration of the computation processing circuit 25, which carries out a scaling processing based on the equation shown in FIG. 10. As shown in the drawing, the computation processing circuit 25 carries out the computation processing of the equation shown in FIG. 10 by multiplying l*1 and w2 in a multiplier X1, multiplying l*2 and w1 in a multiplier X2, adding w1 and w2 in an adder Y1, adding a value output from the multiplier X1 and a value output from the multiplier X2 in an adder Y2 and dividing a value output from the adder Y2 by a value output from the adder Y1 in a divider Z1. The computation processing circuit 25 outputs the data of the L* component executed with the scaling processing to the post-correction circuit 26 and the second selection circuit 27. The post-correction circuit 26 carries out a post-correction on the data of the L* component output by the computation processing circuit 25 and outputs the post-corrected data of the L* component to the second selection circuit 27. Here, since the data of the L* component does not include a negative value in the numerical range of the pixel value, the second selection circuit 27 selects the data of the L* component output by the computation processing circuit 25 and outputs the selected data of the L* component to the spatial filtering processing circuit 17. That is, the data of the L* component post-corrected by the post-correction circuit 26 is not output to the spatial filtering processing circuit 17.

Figure 5:
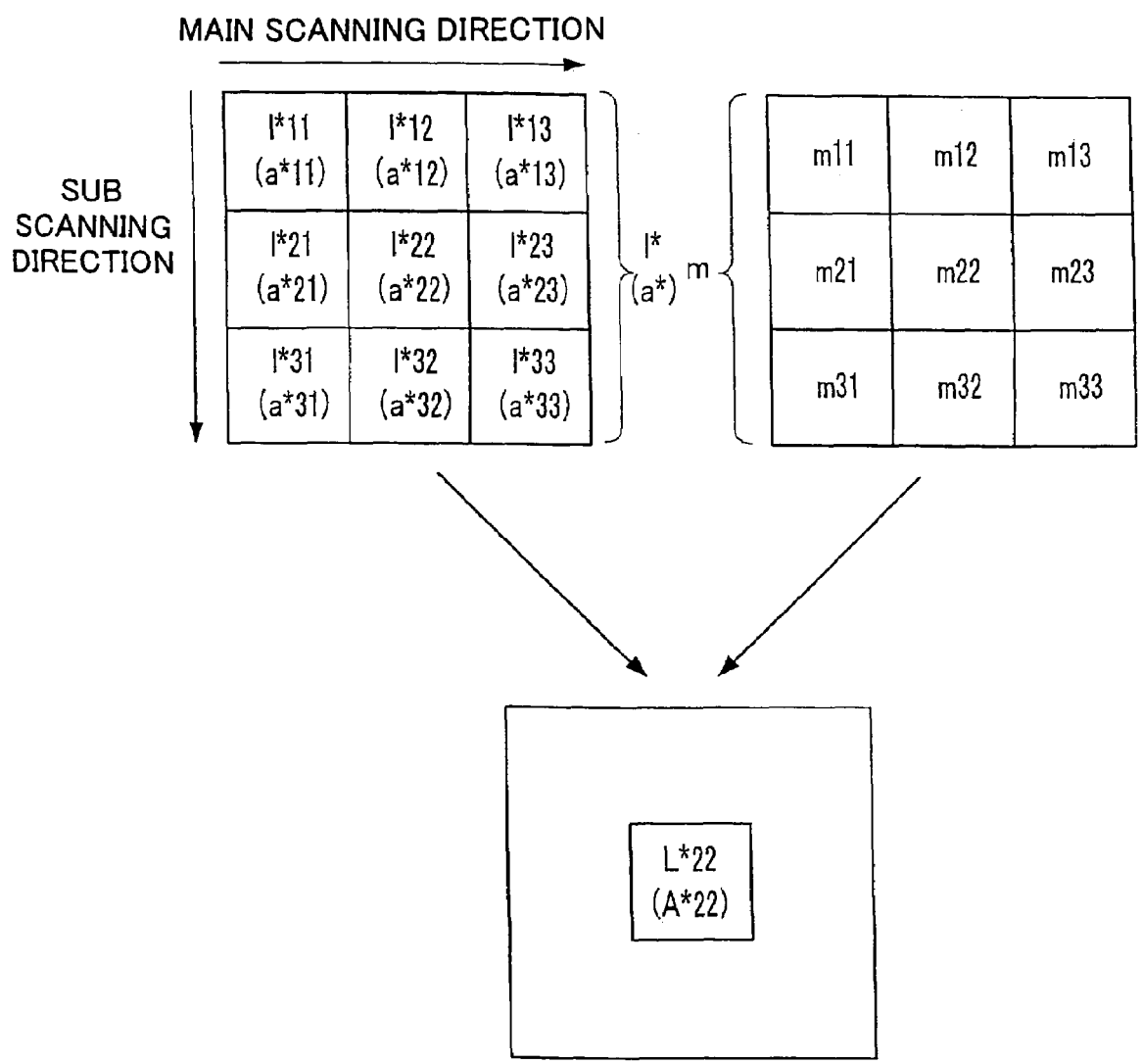
FIG. 5 shows a pixel value and a filtering coefficient.

The data of the L* component input to the spatial filtering processing circuit 17 is input to the pre-correction circuit 28 and the first selection circuit 29 in the same manner as the scaling processing circuit 16. The pre-correction circuit 28 carries out a pre-correction on the input data of the L* component and outputs the pre-corrected data of the L* component to the first selection circuit 29. Here, since the data of the L* component does not include a negative value in the numerical range of the pixel value, the first selection circuit 29 selects the data of the L* component input from the scaling processing circuit 16 and outputs the selected data of the L* component to the computation processing circuit 30. That is, the data of the L* component pre-corrected by the pre-correction circuit 28 is not output to the computation processing circuit 30. The computation processing circuit 30 carries out a computation of convolution for finding a weighted average by multiplying a target pixel and surrounding pixels by appropriate coefficients (filtering coefficients). As shown in FIG. 5, suppose that the pixel value l*22 of the L* component is the target pixel and pixel values l*ij (i, j=1, 2, 3) and filtering coefficients mij (i, j=1, 2, 3) are provided. Then, by carrying out a computation of an equation shown in FIG. 11, a pixel value L*22 executed with the spatial filtering processing is obtained.

Figure 6:
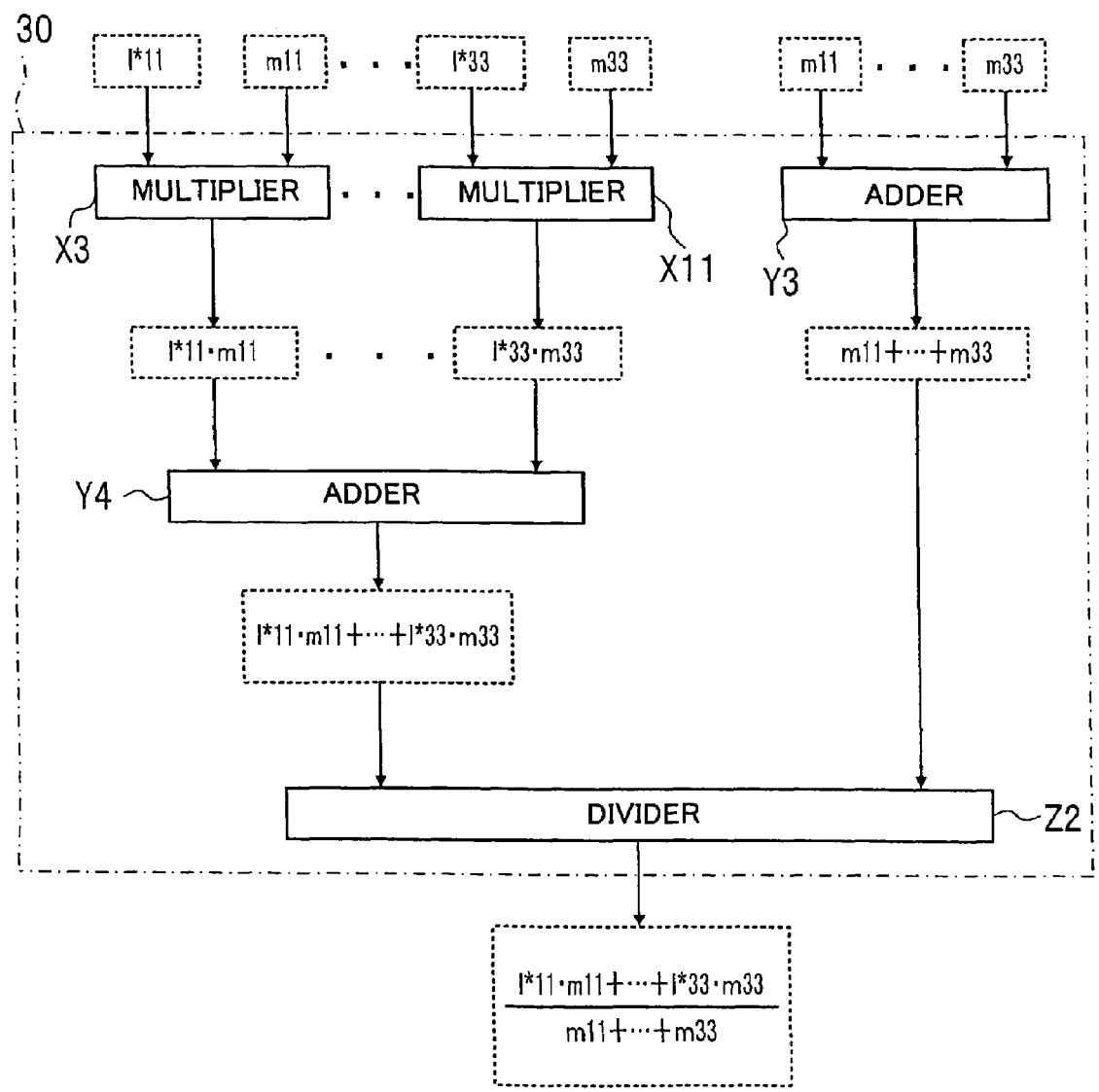
FIG. 6 shows an example of a configuration of a computation processing circuit in a spatial filtering processing circuit.
Figure 11:
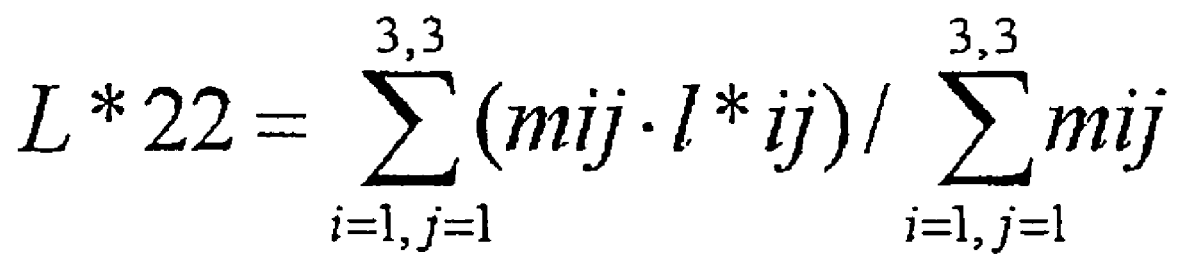

FIG. 6 shows a configuration of the computation processing circuit 30 which carries out a spatial filtering processing based on the equation shown in FIG. 11. As shown in the drawing, the computation processing circuit 30 carries out a computation processing of the equation shown in FIG. 11 by multiplying corresponding l*ij (i, j=1, 2, 3) and mij (i, j=1, 2, 3) in each of multipliers X3 through X11, adding all of filtering coefficients mij (i, j=1, 2, 3) in an adder Y3, adding all of values output from the multipliers X3 through X1 in an adder Y4 and dividing a value output from the adder Y4 by a value output from the adder Y3 in a divider Z2. The computation processing circuit 30 outputs the data of the L* component executed with the spatial filtering processing to the post-correction circuit 31 and the second selection circuit 32. The post-correction circuit 31 carries out a post-correction on the data of the L* component output from the computation processing circuit 30 and outputs the post-corrected data of the L* component to the second selection circuit 32. Here, since the data of the L* component does not include a negative value in the numerical range of the pixel value, the second selection circuit 32 selects the data of the L* component output by the computation processing circuit 30 and outputs the selected data of the L* component to the output image processing circuit 18. That is, the data of the L* component post-corrected by the post-correction circuit 31 is not output to the output image processing circuit 18.

Meanwhile, in case the data of the a* component is input to the scaling processing circuit 16, the data of the a* component is input to the pre-correction circuit 23 and the first selection circuit 24. The pre-correction circuit 23 carries out a pre-correction on the data of the a* component and outputs the pre-corrected data of the a* component to the first selection circuit 24. For example, in case a pixel value of the a* component is "−45", the pre-correction circuit 23 reverses "1" of a highest-order bit of "11010011" expressed by two's complement into "0". The pixel value of the data of the a* component pre-corrected in the above-described manner becomes "01010011", in other words, "83". That is, by reversing the highest-order bit of the pixel value, the pre-correction circuit 23 adds 128 to the input pixel value and corrects the numerical range of the pixel value of the a* component, which is from −128 to 127, into from 0 to 255. Accordingly, the computation processing circuit, which executes the computation processing on the data that takes both a positive value and a negative value, is not required to be provided, and only the computation processing circuit, which executes the computation processing on the data that takes only a positive value, can be provided. Moreover, the pre-correction circuit corrects the numerical range of the pixel value to a positive value. As a result, since the bit expressing the code becomes unnecessary, the bit number of the computation processing circuit does not become large. Thus, the hardware configuration of the image processing circuit can be simplified. The pre-correction circuit 23 outputs the pre-corrected data of the a* component to the first selection circuit 24. Here, since the data of the a* component includes a negative value in the numerical range of the pixel value, the first selection circuit 24 selects the data of the a* component output by the pre-correction circuit 23 and outputs the selected data of the a* component to the computation processing circuit 25. That is, the data of the a* component input from the multiplexer 15 is not output to the computation processing circuit 25.

The computation processing circuit 25 carries out the computation processing shown in FIG. 10 on the data of the a* component output by the first selection circuit 24 in the same manner as the data of the L* component. As shown in FIG. 3, in case pixel values a*1 and a*2 of the a* component are given, considering that 128 is added to an actual value of the pixel value of the a* component by the pre-correction circuit 24, in the equation shown in FIG. 10, if a*1+128 is substituted in l*1 and a*2+128 is substituted in l*2 and a pixel value to be interpolated is A*1, the equation shown in FIG. 10 becomes a calculation equation shown in FIG. 12.

As shown in FIG. 12, the computation processing circuit 25 calculates the pixel value of the a* component in which 128 is added to the pixel value to be interpolated. Therefore, the data of the a* component executed with the scaling processing can be input to the post-correction circuit 26, and the post-correction circuit 26 can subtract 128 from pixel value of the a* component executed with the scaling processing. The computation processing circuit 25 outputs the data of the a* component executed with the scaling processing to the post-correction circuit 26 and the second selection circuit 27.

The post-correction circuit 26 carries out a post-correction on the data of the a* component output by the computation processing circuit 25. For example, in case the pixel value of the a* component is "122", "1" of a highest-order bit of "11010011" expressed by a binary digit is reversed to "0". The pixel value of the a* component post-corrected in the above-described manner becomes "01010011" expressed by two's complement, in other words, "−6". That is, by reversing the highest-order bit of the pixel value, the post-correction circuit 26 subtracts 128 from the input pixel value and calculates the pixel value to be found. That is, the post-correction circuit 26 returns the numerical range of the pixel value of the a* component, which has been corrected by the pre-correction circuit 23 to be from 0 to 255, to the numerical range from −128 to 127. The post-correction circuit 26 outputs the post-corrected data of the a* component to the second selection circuit 27. Here, since the data of the a* component includes a negative value in the numerical range of the pixel value, the second selection circuit 27 selects the data of the a* component output by the post-correction circuit 26 and outputs the selected data of the a* component to the spatial filtering processing circuit 17. That is, the data of the a* component output by the computation processing circuit 25 is not output to the spatial filtering processing circuit 17.

In the spatial filtering processing circuit 17, the data of the a* component is input to the pre-correction circuit 28 and the first selection circuit 29. The pre-correction circuit 28 carries out a pre-correction on the data of the a* component input from the scaling processing circuit 16 and outputs the pre-corrected data of the a* component to the first selection circuit 29. Here, since the data of the a* component includes a negative value in the numerical range of the pixel value, the first selection circuit 29 selects the data of the color component output by the pre-correction circuit 28 and outputs the selected data of the color component to the computation processing circuit 30. That is, the data of the a* component input from the scaling processing circuit 16 is not output to the computation processing circuit 30. The computation processing circuit 30 carries out the computation processing shown in FIG. 11 on the data of the a* component output by the first selection circuit 29 in the same manner as the data of the L* component. Here, as shown in FIG. 5, in case a pixel value a*ij (i, j=1, 2, 3) of the a* component is given, considering that 128 is added to an actual value of the pixel value of the a* component by the pre-correction circuit 28, in the equation shown in FIG. 11, if a*ij+128 is substituted in l*ij and a pixel value to be found is A*22, the equation shown in FIG. 11 becomes a calculation equation shown in FIG. 13.

As shown in FIG. 13, the computation processing circuit 30 calculates the pixel value of the a* component, which 128 is added to the pixel value to be found. Therefore, the data of the a* component executed with the spatial filtering processing can be input to the post-correction circuit 31 and the post-correction circuit 31 can subtract 128 from the pixel value of the a* component executed with the spatial filtering processing. The computation processing circuit 30 outputs the data of the a* component executed with the spatial filtering processing to the post-correction circuit 31 and the second selection circuit 32. The post-correction circuit 31 carries out a post-correction on the data of the a* component output by the computation processing circuit 30 and outputs the post-corrected data of the a* component to the second selection circuit 32. Here, since the data of the a* component includes a negative value in the numerical range of the pixel value, the second selection circuit 32 outputs the data of the a* component output by the post-correction circuit 31 to the output color image processing circuit 18. That is, the data of the a* component output by the computation processing circuit 30 is not output to the output image processing circuit 18.

Further, a processing operation of the scaling processing circuit 16 and the spatial filtering processing circuit 17 for the data of the b* component, which includes a negative value in the numerical range in the same manner as the data of the a* component, is carried out in the same manner as the processing operation for the data of the a* component. The color image data of the RGB color system, which the pixel value is expressed by eight bits, is output to the scaling processing circuit 16 for each color component by the multiplexer 15, in the same manner as the color image data of the L*a*b* color system. Since the data of each of the R, G, B color components does not include a negative value in the numerical range of the pixel value, the processing operation of the scaling processing circuit 16 and the spatial filtering processing circuit 17 for the data of each of the R, G, B color components is carried out in the same manner as the processing operation for the data of the L* component.

Next, a description will be made of another example of the color image processing device 1 according to the first embodiment of the present invention. In the color image processing device 1 of the other example of the first embodiment, only the configuration of the spatial filtering processing circuit 17 differs from the color image processing device 1 shown in FIG. 1 and FIG. 2. Therefore, for a part that is common with the color image processing device 1, same reference numeral will be applied and a description will be omitted. Only a different part will be described.

Figure 7:
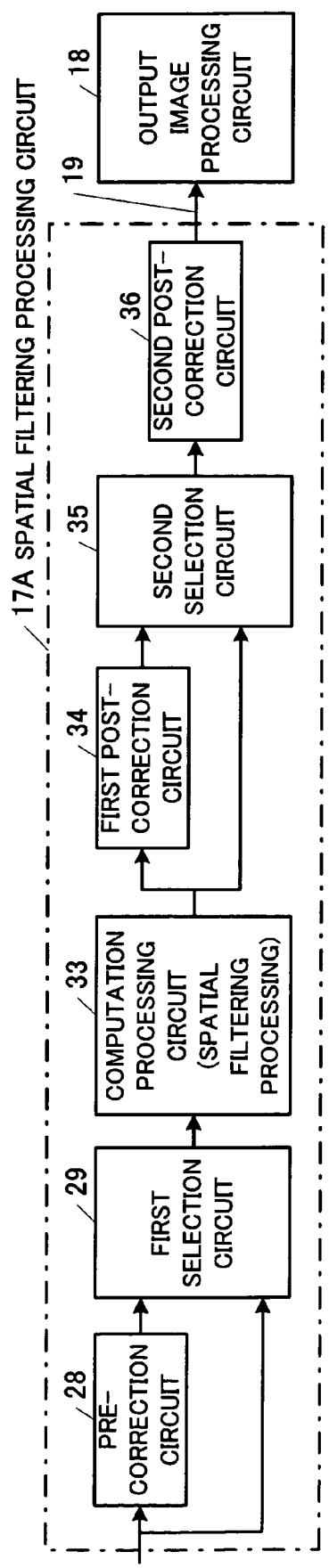
FIG. 7 shows an example of a configuration of the spatial filtering processing circuit of a color image processing device according to another example of the first embodiment of the present invention.

As shown in FIG. 7, a spatial filtering processing circuit 17A of the color image processing device includes a pre-correction circuit 28, a first selection circuit 29, a computation processing circuit 33, a first post-correction circuit 34, a second selection circuit 35 and a second post-correction circuit 36. When comparing the spatial filtering processing circuit 17A with the spatial filtering processing circuit 17 shown in FIG. 2, in the spatial filtering processing circuit 17, the computation processing circuit 30, the post-correction circuit 31 and the second selection circuit 32 are provided after the first selection circuit 29. In the spatial filtering processing circuit 17A, the computation processing circuit 33, the first post-correction circuit 34, the second selection circuit 35 and the second post-correction circuit 36 are provided after the first selection circuit 29.

The computation processing circuit 30 carries out the spatial filtering processing based on the equation shown in FIG. 11. The computation processing circuit 33 carries out a computation processing on the data of each of the L*, a*, b* color components for calculating a sum of a product of a plurality of pixel values and prescribed filtering coefficients. The first post-correction circuit 34 carries out a prescribed computation processing on the data of the color component output by the computation processing circuit 33 by using a sum of the filtering coefficients, which is different from the reversal of the highest-order bit carried out by the post-correction circuit 31. According to the color component, the second selection circuit 35 selectively outputs the data of the color component output by the computation processing circuit 33 or the data of the color component executed with the prescribed computation processing by the first post-correction circuit 34. Specifically, with respect to the data of the color component (each of the R, G, B color components and the L* component), which does not include a negative value in the numeric value of the pixel value, the data of the color component output by the computation processing circuit 33 is output directly to the second post-correction circuit 36. With respect to the data of the color component (the a* component and the b* component), which includes a negative value in the numerical range of the pixel value, the data of the color component executed with the prescribed computation processing by the first post-correction circuit 34 is output to the second post-correction circuit 36. Therefore, the first post-correction circuit 34 and the second selection circuit 35 function as a first post-correction unit which selectively outputs according to the color component, the data of the color component output by the computation processing circuit 33 or the data of the color component executed with the prescribed computation processing by the first post-correction circuit 34. The second post-correction circuit 36 carries out a computation processing for dividing the data of the color component output by the second selection circuit 35 by a power-of-two.

Next, a description will be made of a processing operation of the spatial filtering processing circuit 17A when carrying out a spatial filtering processing on the color image data of the L*a*b* color system. In case the data of the L* component is input to the spatial filtering processing circuit 17A, the data of the L* component is input to the pre-correction circuit 28 and the first selection circuit 29. The pre-correction circuit 28 carries out a pre-correction on the input data of the L* component and outputs the pre-corrected data of the L* component to the first selection circuit 29. Here, since the data of the L* component does not include a negative value in the numerical range of the pixel value, the first selection circuit 29 selects the data of the L* component input from the scaling processing circuit 16 and outputs the selected data of the L* component to the computation processing circuit 33. That is, the data of the L* component pre-corrected by the pre-correction circuit 28 is not output to the computation processing circuit 33. In case the pixel values l*ij (i, j=1, 2, 3) of the L* component and the filtering coefficients mij (i, j=1, 2, 3) are given, the computation processing circuit 33 carries out a computation processing to calculate a sum of a product of a plurality of pixel values and prescribed filtering coefficients based on the equation shown in FIG. 14 and calculates the pixel value L*22'.

Figure 14:
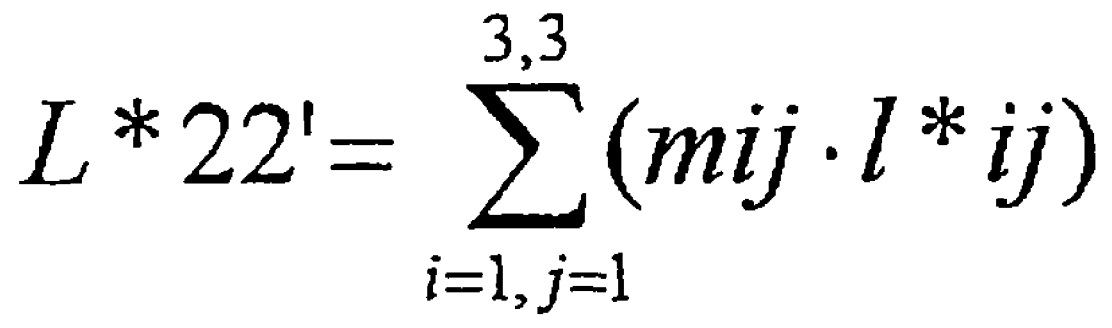

When comparing the equation shown in FIG. 11 and the equation shown in FIG. 14, in the equation shown in FIG. 11, the pixel value calculated by the equation shown in FIG. 14 is divided by the sum of the filtering coefficients. However, in the equation shown in FIG. 14, a division is not carried out. Therefore, the second post-correction circuit 36 carries out a division on the data of the L* component. The computation processing circuit 30 outputs the data of the L* component executed with the computation processing of the equation shown in FIG. 14 to the first post-correction circuit 34 and the second selection circuit 35. The first post-correction circuit 34 carries out a prescribed computation processing by using the sum of the filtering coefficients on the data of the L* component output by the computation processing circuit 33. Then, the first post-correction circuit 34 outputs the data of the L* component executed with the computation processing to the second selection circuit 35. Here, since the data of the L* component does not include a negative value in the numerical range of the pixel value, the second selection circuit 35 selects the data of the L* component output by the computation processing circuit 33 and outputs the selected data of the L* component to the second post-correction circuit 36. That is, the data of the L* component executed with the prescribed computation processing by the first post-correction circuit 34 is not output to the second post-correction circuit 36.

Figure 15:
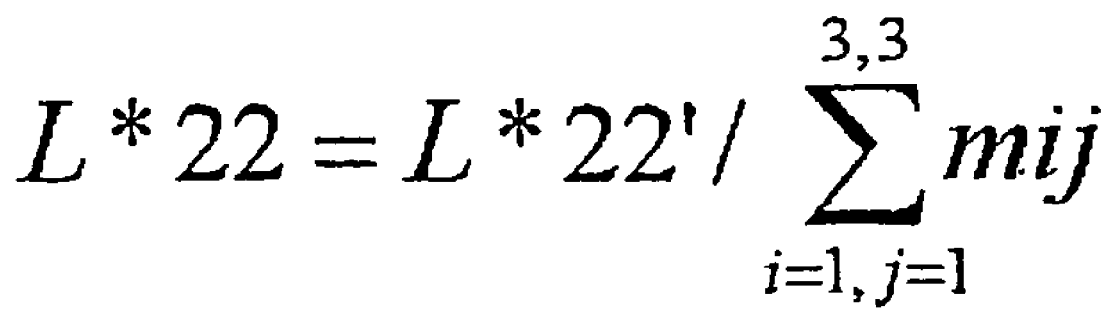

The second post-correction circuit 36 executes the computation processing shown in FIG. 15 to divide the data of the L* component output by the second selection circuit 35 by a power-of-two. Accordingly, the data of the L* component executed with the spatial filtering processing is output to the output image processing circuit 18.

By setting the filtering coefficients mij so that the sum of the filtering coefficients mij becomes a power-of-two, the division of the equation shown in FIG. 15 can be carried out by a bit shift. As a result, the computation processing of the equation shown in FIG. 15 can be carried out easily. By dividing L*22' by a value of a power-of-two that is different from the sum of the filtering coefficients mij, the data of the L* component, which is executed with the spatial filtering processing and which a brightness has been changed, can be output. For example, by dividing L*22' by a value of a power-of-two that is smaller than the sum of the filtering coefficients mij, the data of the L* component, which has a higher brightness than the data of the L* component divided by the sum of the filtering coefficients mij, can be calculated. By dividing L*22' by a value of a power-of-two that is larger than the sum of the filtering coefficients mij, the data of the L* component, which has a lower brightness than the data of the L* component divided by the sum of the filtering coefficients mij, can be calculated. As described above, when the data of the L* component is input to the spatial filtering processing circuit 17A, the computation processing of the equation shown in FIG. 14 is carried out in the computation processing circuit 33 and the division of the equation shown in FIG. 15 is carried out in the second post-correction circuit 36.

When the data of the a* component is input to the spatial filtering processing circuit 17A, the data of the a* component is input to the pre-correction circuit 28 and the first selection circuit 29. The pre-correction circuit 28 carries out a pre-correction on the data of the a* component input from the scaling processing circuit 16 and outputs the pre-corrected data of the a* component to the first selection circuit 29. Here, since the data of the a* component includes a negative value in the numerical range of the pixel value, the first selection circuit 29 selects the data of the color component output by the pre-correction circuit 28 and outputs the selected data of the color component to the computation processing circuit 33. That is, the data of the a* component input from the scaling processing circuit 16 is not output to the computation processing circuit 33. The computation processing circuit 33 carries out the computation processing shown in FIG. 14 on the data of the a* component output by the first selection circuit 29 in the same manner as the L* component. Here, as shown in FIG. 5, in case the pixel value a*ij (i, j=1, 2, 3) of the a* component is given, considering that 128 is added to an actual value of the pixel value of the a* component in the pre-correction circuit 28, if a*1+128 is substituted in l*ij and a pixel value to be found is A*22', the equation shown in FIG. 14 becomes a calculation equation shown in FIG. 16.

As shown in FIG. 16, the computation processing circuit 33 calculates a pixel value of the a* component that adds a value, which multiplies 128 and the sum of the filtering coefficients, to the value to be found. Therefore, the first post-correction circuit 34 can subtract the value, which multiplies 128 and the sum of the filtering coefficients, from the pixel value of the a* component. The computation processing circuit 33 outputs the data of the a* component executed with the computation processing of the equation shown in FIG. 16 to the first post-correction circuit 34 and the second selection circuit 35.

The first post-correction circuit 34 carries out a prescribed computation processing by using the sum of the filtering coefficients based on the equation shown in FIG. 17 on the data of the a* component output by the computation processing circuit 33.

The first post-correction circuit 34 outputs the data of the a* component executed with the computation processing of the equation shown in FIG. 17 to the second selection circuit 35. Here, since the data of the a* component includes a negative value in the numerical range of the pixel value, the second selection circuit 35 selects the data of the a* component output by the first post-correction circuit 34 and outputs the selected data of the a* component to the second post-correction circuit 36. That is, the data of the a* component output by the computation processing circuit 33 is not output to the second post-correction circuit 36. The second post-correction circuit 36 carries out the computation shown in FIG. 15 on the data of the a* component output by the second selection circuit 35 in the same manner as the L* component. As described above, when the data of the a* component is input to the spatial filtering processing circuit 17A, the computation processing circuit 33 carries out the computation processing of the equation shown in FIG. 16, the first post-correction circuit 34 carries out the correction by carrying out the computation processing of the equation shown in FIG. 17, and the second post-correction circuit 36 carries out the subtraction of the equation shown in FIG. 15.

Further, the computation processing of the spatial filtering processing circuit 17A for the data of the b* component, which includes a negative value in the numerical range in the same manner as the data of the a* component, is carried out in the same manner as the computation processing for the data of the a* component. Moreover, since the data of each of the R, G, B color components takes only a positive value, the computation processing of the spatial filtering processing circuit 17A for the data of each of the R, G, B color components is carried out in the same manner as the computation processing for the data of the L* component.

As described above, in the spatial filtering processing circuit 17A, the computation processing circuit 33; the first post-correction circuit 34, the second selection circuit 35 and the second post-correction circuit 36 are provided after the first selection circuit 29. Since the computation processing carried out by the second post-correction circuit 36 is a bit-shift, the configuration of the spatial filtering processing circuit 17A is simple like the spatial filtering processing circuit 17.

Next, a color image processing device according to a second embodiment of the present invention will be described. In the color image processing device according to the second embodiment, only the configuration of the image processing circuit 6 differs from the color image processing device 1 shown in FIG. 1 and FIG. 2. In the following, for a part that is common with the color image processing device 1 according to the first embodiment, the same reference numeral will be applied and the description will be omitted. Only a different part will be described.

Figure 8:
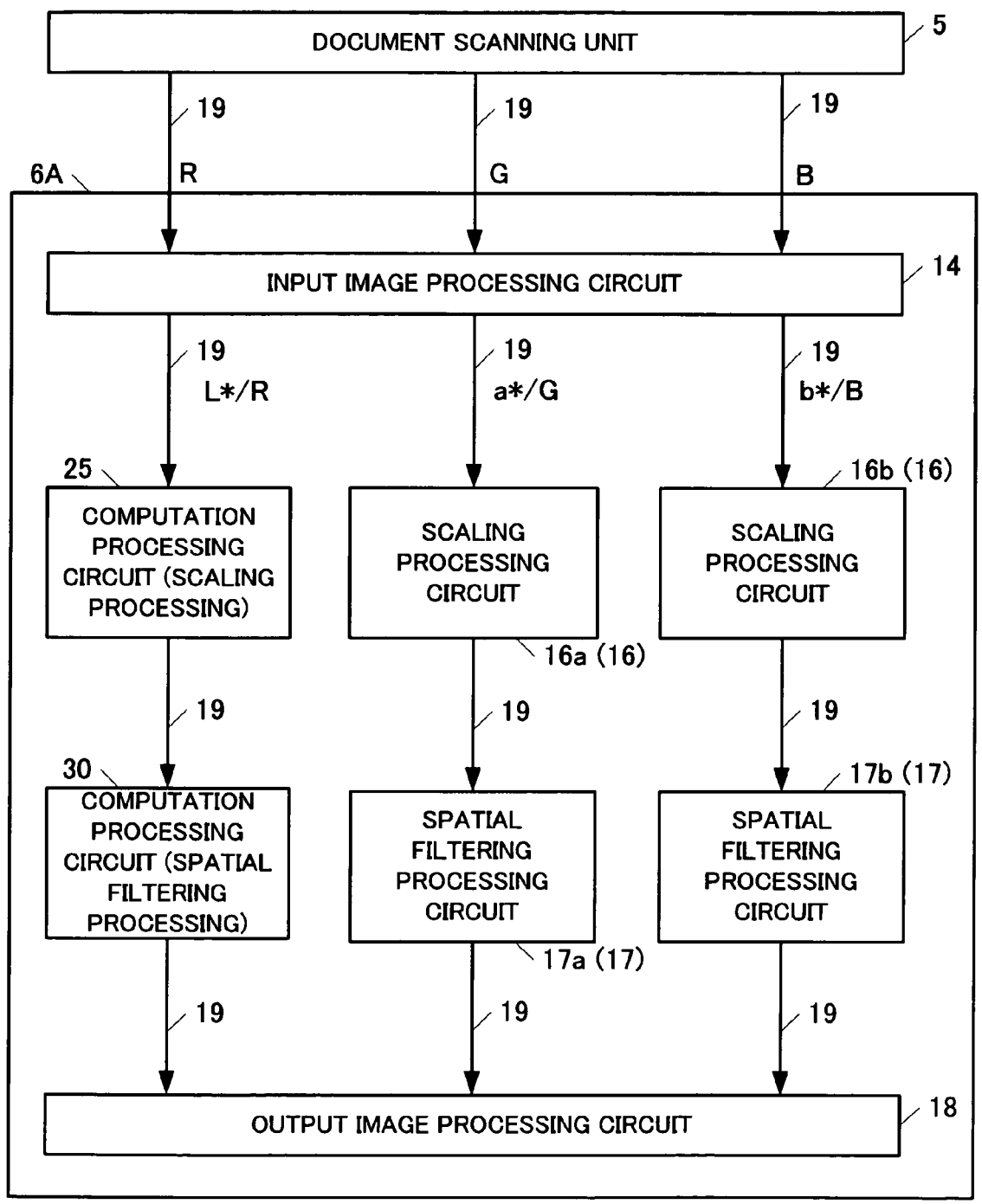
FIG. 8 shows an example of a configuration of an image processing unit of a color image processing device according to a second embodiment of the present invention.

The image processing unit 6 described with reference to FIG. 2 includes one scaling processing circuit 16 and one spatial filtering processing circuit 17 and carries out a processing on the color image data of the RGB color system or the color image data of the L*a*b* color system for each color component by a time-division. As shown in FIG. 8, an image processing unit 6A of the color image processing device according to the second embodiment includes a circuit for carrying out a scaling processing and a circuit for carrying out a spatial filtering processing for each color component. Among the color image data of the RGB color system and the color image data of the L*a*b* color system, the data of the L* component and the data of the R* component are configured to be processed in the same circuit. Since the data of the L* color component and the data of the R* component are the data which do not include a negative value in the numerical range of the pixel value, a pre-correction or a post-correction is not necessary. After the scaling processing is executed by the computation processing circuit 25, the spatial filtering processing is executed by the computation processing circuit 30. Moreover, the data of the a* component and the data of the G component are configured to be processed in the same circuit. However, the data of the a* component is the data which includes a negative value in the numerical range of the pixel value, and the data of the G component is the data which does not include a negative value in the numerical range of the pixel value. Therefore, the data of the a* component and the data of the G component are processed in a scaling processing circuit 16a (16), which is the same as the scaling processing circuit 16, and a spatial filtering processing circuit 17a (17), which is the same as the spatial filtering processing circuit 17. Moreover, the data of the b* component and the data of the B component are configured to be processed in the same circuit as the data of the a* component and the data of the G component. The data of the b* component and the data of the B component are processed in a scaling processing circuit 16b (16), which is the same as the scaling processing circuit 16, and a spatial filtering processing circuit 17b (17), which is the same as the spatial filtering processing circuit 17.

As described above, the circuit for carrying out the scaling processing and the circuit for carrying out the spatial filtering processing are provided for each color component. Although the configuration of the image processing unit 6A becomes large compared with the image processing unit 6, the data of each color component can be processed simultaneously. Therefore, the color image processing device according to the second embodiment can carry out the processing under higher speed compared with the color image processing device 1 which processes each color component data of the color image data of the RGB color system or the color image data of the L*a*b* color system by a time-division.

Figure 9:
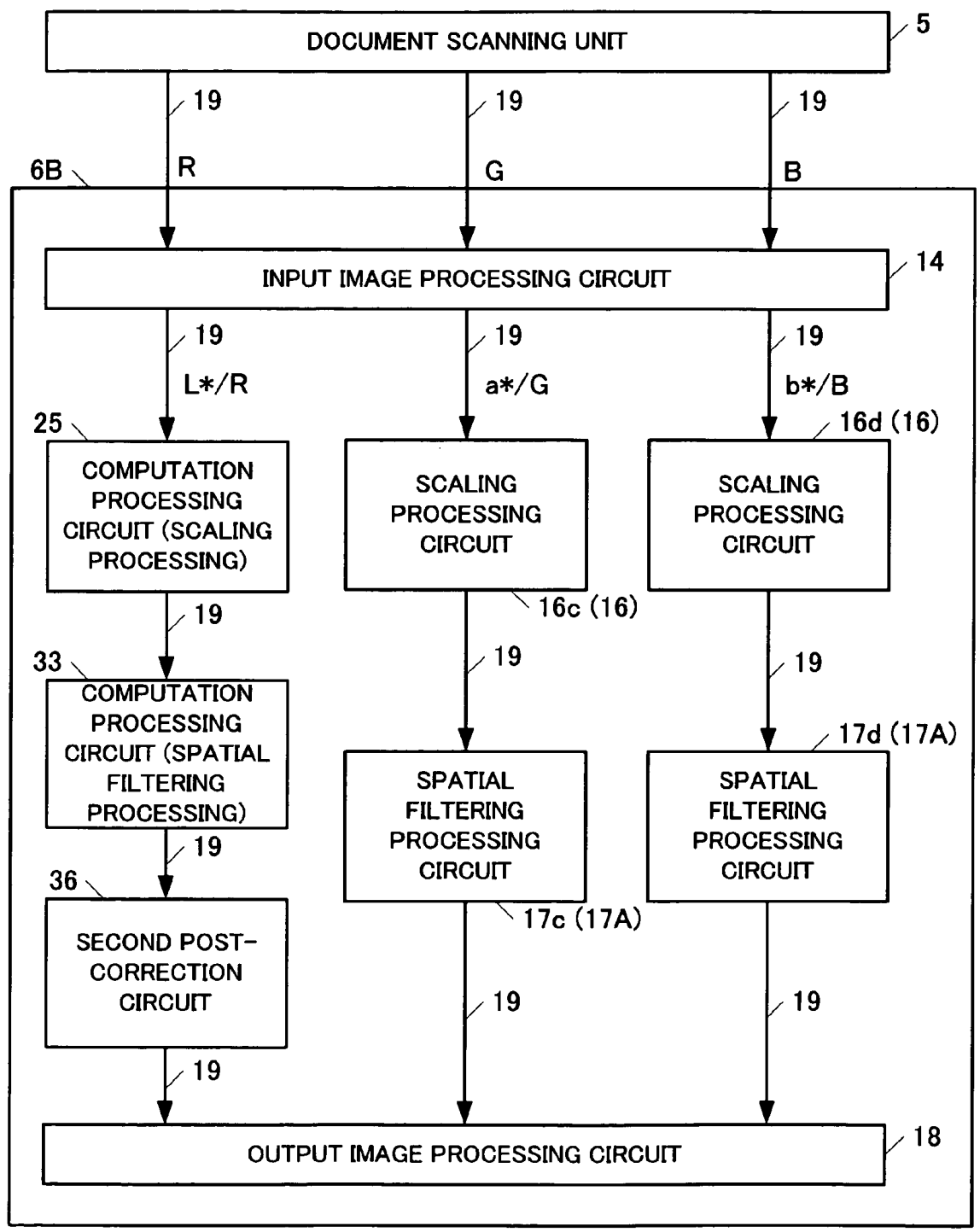
FIG. 9 shows an example of a configuration of an image processing unit of a color image processing device according to another example of the second embodiment of the present invention.
Figure 18:
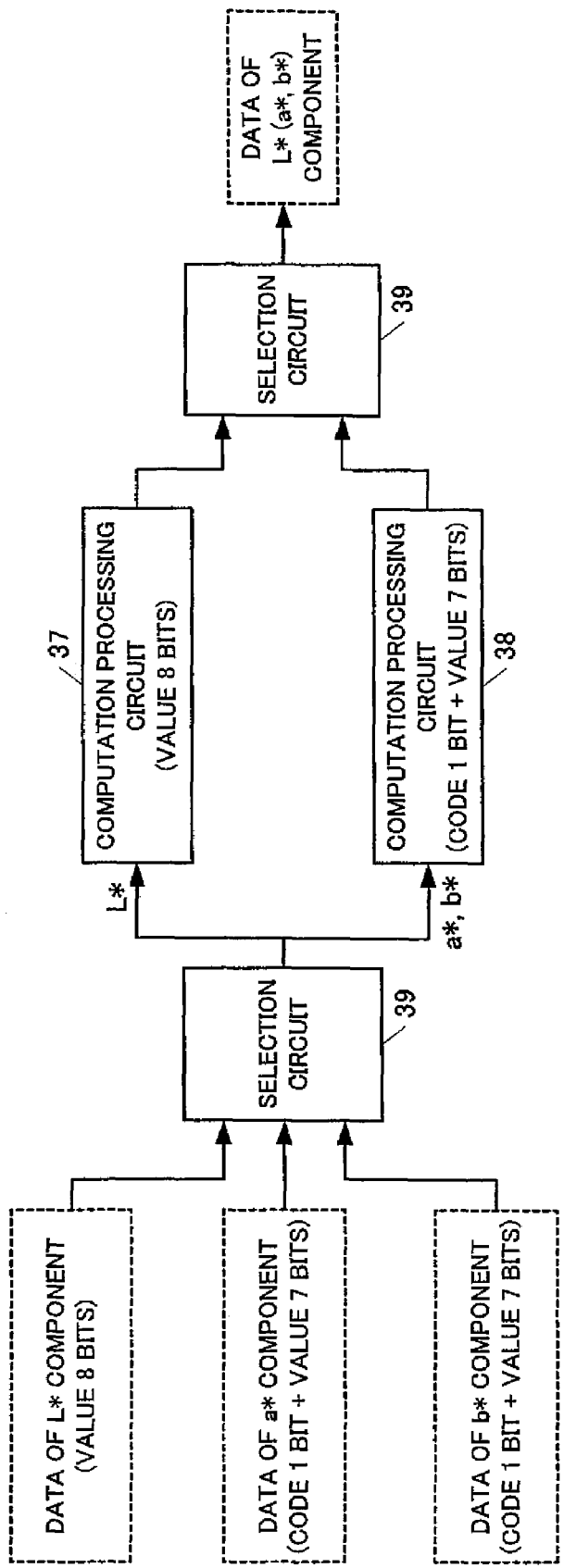
FIG. 18 shows an example of a configuration of a conventional image processing circuit.

In the image processing unit 6B shown in FIG. 9, the data of the L* component and the data of the R component are configured so that the spatial filtering processing is executed in the computation processing circuit 33 and the second post-correction circuit 36. In this case, since the data of the L* component and the data of the R component are data which do not include a negative value in the numerical range of the pixel value, the pre-correction circuit 28, the first selection circuit 29, the first post-correction circuit 34 and the second selection circuit 35 are unnecessary. The data of the a* component and the data of the G component are configured to be processed in a spatial filtering processing circuit 17c (17A), which is the same as the spatial filtering processing circuit 17A. The data of the b* component and the data of the B component are configured to be processed in a spatial filtering processing circuit 17d (17A), which is the same as the spatial filtering processing circuit 17A.

Further, in the above-described embodiment of the present invention, a description has been made of a case in which the image processing unit 6 carries out the scaling processing and the spatial filtering processing. However, another image processing circuit can be provided and in the same manner as the image processing unit 6, data with a code and data without a code can be processed in the same circuit. In this case, in place of the computation processing circuit which carries out the scaling processing and the computation processing circuit which carries out the spatial filtering processing, a computation processing circuit which carries out a computation processing corresponding to the image processing can be provided.

In the above-described embodiment of the present invention, a description has been made of a case in which the scaling processing circuit 16 and the spatial filtering processing circuit 17 carry out the image processing on the color image data of the RGB color system and the L*a*b* color system. However, the color space of the color image data input to the scaling processing circuit 16 and the spatial filtering processing circuit 17 is not limited to the above-mentioned color spaces. For example, color image data of bg-sRGB color system, color image data of scRGB color system or color image data of YCrCb color system can be used. In this case, the input image processing circuit 14 can be configured to carry out a processing to convert the color image data of the RGB color system output from the document scanning unit 5 into these color spaces (bg-sRGB color system, scRGB color system and YCrCb color system). In the above-described embodiment, a description has been made of the image processing for the data of eight bits. However, the image processing can be executed also on the data of 10 bits or 12 bits.

The invention claimed is:

1. A color image processing device, comprising:
means for inputting color image data including data of a plurality of color components;
a pre-correcting means which includes a pre-correction circuit that carries out a pre-correction before a prescribed computation processing to reverse a highest-order bit of a pixel value on data of a color component input from the means for inputting and which selectively outputs the data of the color component input from the means for inputting or the data of the color component pre-corrected by the pre-correction circuit according to the color component;
a computation processing means for carrying out the prescribed computation processing on the data of the color component output by the pre-correcting means and outputting the data of the color component carried out with the prescribed computation processing; and
a post-correcting means which includes a post-correction circuit that carries out a post-correction after the pre-correction to reverse a highest-order bit of a pixel value on the data of the color component output by the computation processing means after the pre-correction and which selectively outputs to a prescribed output destination according to the color component, the data of the color component output by the computation processing means after the pre-correction or the data of the color component post-corrected by the post-correction circuit after the pre-correction, wherein
the prescribed computation processing carried out by the computation processing means is a spatial filtering processing which calculates a pixel value by carrying out a computation of convolution by using a plurality of pixel values and prescribed filtering coefficients.

2. The color image processing device according to claim 1, wherein the prescribed computation processing carried out by the computation processing means also includes a scaling processing which calculates a pixel value by carrying out a computation of interpolation by using a plurality of pixel values.

3. The color image processing device according to claim 1, wherein the pre-correcting means outputs the data of the color component input from the means for inputting for data of a color component that does not include a negative value in a numerical range and outputs the data of the color component pre-corrected by the pre-correction circuit for data of a color component that includes a negative value in the numerical range; and
the post-correcting means outputs the data of the color component output by the computation processing means to a prescribed output destination for the data of the color component that does not include a negative value in the numerical range and outputs the data of the color component post-corrected by the post-correction circuit to the prescribed output destination for the data of the color component that includes a negative value in the numerical range.

4. The color image processing device according to claim 1, wherein the means for inputting inputs data expressed by a L*a*b* color system;
the pre-correcting means outputs the data of the color component input from the means for inputting for data of a L* component and outputs the data of the color component pre-corrected by the pre-correction circuit for data of an a* component and a b* component; and
the post-correcting means outputs the data of the color component output by the computation processing means to a prescribed output destination for the data of the L* component and outputs the data of the color component post-corrected by the post-correction circuit to the prescribed output destination for the data of the a* component and the b* component.

5. A color image processing device comprising:
means for inputting color image data including data of a plurality of color components;
a pre-correcting means which includes a pre-correction circuit that carries out a pre-correction before a prescribed computation processing to reverse a highest-order bit of a pixel value on data of a color component input from the means for inputting and which selectively outputs the data of the color component input from the means for inputting or the data of the color component pre-corrected by the pre-correction circuit according to the color component;
a computation processing means for carrying out the prescribed computation processing on the data of the color component output by the pre-correcting means and outputting the data of the color component carried out with the prescribed computation processing; and
a post-correcting means which includes a post-correction circuit that carries out a post-correction after the pre-correction to reverse a highest-order bit of a pixel value on the data of the color component output by the computation processing means after the pre-correction and which selectively outputs to a prescribed output destination according to the color component, the data of the color component output by the computation processing means after the pre-correction or the data of the color component post-corrected by the post-correction circuit after the pre-correction, wherein
the means for inputting selectively inputs data expressed by a L*a*b* color system and data expressed by a Red-Green-Blue (RGB) color system;
the pre-correcting means outputs the data of the color component input from the means for inputting for data of a L* component and RGB components and outputs the data of the color component pre-corrected by the pre-correction circuit for data of an a* component and a b* component; and
the post-correcting means outputs the data of the color component output by the computation processing means to a prescribed output destination for the data of the L* component and the RGB components and outputs the data of the color component post-corrected by the post-correction circuit to the prescribed output destination for the data of the a* component and the b* component.

* * * * *